US012258995B2

(12) United States Patent
Steffenfauseweh et al.

(10) Patent No.: US 12,258,995 B2
(45) Date of Patent: Mar. 25, 2025

(54) DAMPING ARRANGEMENT, COMPONENT WITH DAMPING ARRANGEMENT AS WELL AS CORRESPONDING COMPONENT CONNECTION, A MANUFACTURING METHOD AND A CONNECTING METHOD

(71) Applicant: Böllhoff Verbindungstechnik GmbH, Bielefeld (DE)

(72) Inventors: Sandra Steffenfauseweh, Verl (DE); Alexander Vorderwisch, Steinhagen (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 217 days.

(21) Appl. No.: 17/513,823

(22) Filed: Oct. 28, 2021

(65) Prior Publication Data
US 2022/0136541 A1 May 5, 2022

(30) Foreign Application Priority Data

Oct. 29, 2020 (DE) .......................... 102020128549.3

(51) Int. Cl.
*F16B 5/02* (2006.01)
*F16B 19/02* (2006.01)
(Continued)

(52) U.S. Cl.
CPC .......... *F16B 5/0241* (2013.01); *F16B 5/0258* (2013.01); *F16B 5/0266* (2013.01);
(Continued)

(58) Field of Classification Search
CPC ..... F16B 5/0241; F16B 5/0258; F16F 1/3735; B60R 16/0222
(Continued)

(56) References Cited

U.S. PATENT DOCUMENTS 2,878,036 A * 3/1959 Simmons ................. B60D 1/50
280/485
3,457,825 A * 7/1969 Marcel .................... F16B 43/00
411/544
(Continued)

FOREIGN PATENT DOCUMENTS

CN 110081052 A 8/2019
CN 111140612 A 5/2020
(Continued)

OTHER PUBLICATIONS

EP Extended Search Report for EP Application No. 21205205.4 dated Apr. 11, 2022 (11 pages).
(Continued)

*Primary Examiner* — Flemming Saether
(74) *Attorney, Agent, or Firm* — Reising Ethington P.C.

(57) ABSTRACT

A damping arrangement which is fastenable in an opening of a first component and by which a dampened connection of the first component with a second component is realizable, including, two identically constructed damping elements. Each damping element includes: a head portion with a first outer diameter, a shaft portion with a second outer diameter that is smaller than the first outer diameter and extends from a bottom side of the head portion, as well as a central first thru-opening, and only one sleeve with a central second thru-opening being arranged at least partly in the central first thru-opening of each damping element by means of a frictional and/or material connection. By means of the only one sleeve, the two identically constructed damping elements with bottom sides, facing each other, of the head portion with the first component arranged in between are fastenable to one another.

16 Claims, 12 Drawing Sheets

(51) Int. Cl.
  *F16B 39/26* (2006.01)
  *F16B 41/00* (2006.01)
  *F16B 43/00* (2006.01)
  *F16F 15/04* (2006.01)
(52) U.S. Cl.
  CPC .............. *F16B 19/02* (2013.01); *F16B 39/26* (2013.01); *F16B 41/002* (2013.01); *F16B 43/00* (2013.01); *F16F 15/04* (2013.01)
(58) Field of Classification Search
  USPC ...... 411/544, 546; 248/608, 609; 16/2.1, 2.2
  See application file for complete search history.

(56) References Cited

U.S. PATENT DOCUMENTS

| | | | |
|---|---|---|---|
| 4,376,254 A * | 3/1983 | Hellmann | H01R 39/14 |
| | | | 310/236 |
| 4,530,491 A | 7/1985 | Bucksbee et al. | |
| 4,656,689 A | 4/1987 | Dennis | |
| 4,883,319 A | 11/1989 | Scott | |
| 5,110,081 A * | 5/1992 | Lang, Jr. | F16F 3/0873 |
| | | | 267/293 |
| 5,537,714 A | 7/1996 | Lynch, Jr. et al. | |
| 5,842,677 A * | 12/1998 | Sweeney | F16F 1/3863 |
| | | | 267/293 |
| 6,328,513 B1 | 12/2001 | Niwa et al. | |
| 7,185,873 B2 * | 3/2007 | Suka | B60K 17/24 |
| | | | 248/635 |
| 7,273,128 B2 | 9/2007 | Niwa et al. | |
| 7,503,552 B2 * | 3/2009 | Huprikar | F16F 1/37 |
| | | | 267/141.1 |
| 8,409,395 B2 | 4/2013 | Schumacher, Jr. et al. | |
| 8,523,154 B2 * | 9/2013 | Fujiwara | F16F 3/0873 |
| | | | 267/141.1 |
| 8,950,738 B2 * | 2/2015 | Nakamura | F16F 1/3735 |
| | | | 267/141.1 |
| 9,771,030 B1 | 9/2017 | Dehaai et al. | |
| 10,655,664 B2 * | 5/2020 | Clark | F16B 5/0258 |
| 10,974,665 B2 | 4/2021 | Heiselbetz | |
| 10,988,180 B2 * | 4/2021 | Asai | F16F 3/0876 |
| 11,143,259 B2 | 10/2021 | Dürre et al. | |
| 11,577,672 B2 * | 2/2023 | Narita | F16F 15/08 |
| 2003/0057334 A1 | 3/2003 | Suka et al. | |
| 2005/0139416 A1 | 6/2005 | Niwa et al. | |
| 2006/0244188 A1 | 11/2006 | Johnson et al. | |
| 2007/0026735 A1 | 2/2007 | Pyron et al. | |
| 2008/0078917 A1 * | 4/2008 | Roehrl | E02F 9/00 |
| | | | 248/555 |
| 2009/0256028 A1 | 10/2009 | Vorderwisch et al. | |
| 2010/0086377 A1 | 4/2010 | De Mola | |
| 2012/0049425 A1 | 3/2012 | Willis | |
| 2017/0207615 A1 | 7/2017 | Trapassi | |
| 2019/0093697 A1 | 3/2019 | Becker et al. | |
| 2019/0161028 A1 | 5/2019 | Heiselbetz | |
| 2019/0234448 A1 | 8/2019 | Owens, II et al. | |
| 2020/0231101 A1 | 7/2020 | Narita | |
| 2020/0271182 A1 | 8/2020 | Hugenschmidt et al. | |
| 2020/0309226 A1 | 10/2020 | Dürre et al. | |
| 2022/0186809 A1 * | 6/2022 | Horibe | F16F 1/3735 |

FOREIGN PATENT DOCUMENTS

| | | |
|---|---|---|
| DE | 19916098 A1 | 10/2000 |
| DE | 102005010433 A1 | 9/2006 |
| DE | 602004002062 T2 | 1/2007 |
| DE | 102016106152 A1 | 10/2017 |
| DE | 102017122236 A1 | 3/2019 |
| DE | 102019104386 A1 | 8/2020 |
| DE | 102019107885 A1 | 10/2020 |
| EP | 1054386 A2 | 11/2000 |
| EP | 2105617 A2 | 9/2009 |
| EP | 2980437 A1 | 2/2016 |
| JP | 2014095441 A | 5/2014 |

OTHER PUBLICATIONS

CN Office Action for CN Application No. 202111267264.X dated Sep. 21, 2023 (9 pages).
CN Office Action for CN Application No. 202111267264.X dated Apr. 28, 2024 (19 pages).

* cited by examiner

DAMPING ARRANGEMENT, COMPONENT WITH DAMPING ARRANGEMENT AS WELL AS CORRESPONDING COMPONENT CONNECTION, A MANUFACTURING METHOD AND A CONNECTING METHOD

CROSS REFERENCE TO RELATED APPLICATIONS

This application claims the priority of German patent application No. DE102020128549.3, filed on Oct. 29, 2020, and the content of this priority application is incorporated herein by reference in its entirety.

TECHNICAL FIELD

The present disclosure is related to a damping arrangement consisting of two, which may be identically constructed, damping elements each having a central, first passage opening and only one sleeve, a first component with a damping arrangement, a component connection by means of a damping arrangement, a manufacturing method of a damping arrangement as well as a connecting method by means of a damping arrangement.

BACKGROUND

Fastening arrangements with damping elements for fastening two components at each other, which have a damping effect due to the damping elements, are generally known in the state of the art. Such fastening arrangements are generally arranged in a component opening of a first component and secured on both sides of the component opening. A connecting screw which is plugged through the fastening arrangement serves for the fastening of the first component at a second component.

For fastening the fastening arrangement in the component opening of the first component, commonly, two differently configured fastening devices are used, each of which being arranged on a component side. Therefore, the fastening arrangement includes correspondingly interacting securing elements, damping elements, sleeves and the like on each component side.

An assembly device for the physically connecting of a device or an electric panel with an assembly structure is for example described in US 2012/0049425 A1. The assembly device offers a shock and power isolation. The assembly device includes an inner and an outer section which are mechanically connected by means of flexible, shock absorbing structures. The outer part of the assembly device is mechanically connected with a fastening structure by means of removable connecting means. A device or an electric plate is fastened at the centre portion of the assembly device by means of fastening means.

US 2017/0207615 A1 relates to a cable guide assembly which is configured to support media cables. The cable guide assembly includes fastening features/structures being configured and dimensioned to releasably mount with respect to a supporting structure.

A fastening device for fastening a decoupling device with respect to a hole edge of a hole recess of a screening part is described in DE 10 2016 106 152 A1. The decoupling device for the oscillating decoupling connection of a sleeve with the screening part has at least one bridging element which includes at its radial outer edge connecting means for the fastening connecting of the bridging element with the hole edge of the screening part. The connecting means have at least four latches projecting radially outwardly from the bridging element. A subset of at least two latches of the bridging element is provided for the abutment at a first outside of the screening part and a remaining quantity of at least two latches is provided for the abutment at an opposite second outside of the screening part. The hole edge with the latches of the subset and the latches of the remaining quantity is attachable with a clamping fit with respect to the decoupling device.

DE 60 2004 002 062 T2 describes a vibration protected heat shield which is fastened at a vibration source such that it covers at least a part of a heat source. Furthermore, it forms a gap with respect to a surface of the referenced heat source in order to reduce a heat radiation from the heat source. The heat shield includes a vibration protected heat shield main body section, a collar member, a washer as well as a connecting member.

A cord connector, which both seals automatically as well as provides a strain relief when a wire is inserted is described in US 2007/0026735 A1. The cord connector includes a wire passageway through a pliable shell which seals around both the wire inserted through the passageway as well as the wall opening into which the plug is fastened. A more rigid skeleton supports this shell and is provided with appendages which permit the wire to pass through the passageway but which block any removal of the wire from the passageway.

EP 2 105 617 A2 describes a two-part fastening arrangement for a surface element being composed of a basic element and a coupling element. The basic element is configured with two sides with a fastening surface at its first side and a connecting pin projecting from its second side, with which pin a snap connection to the coupling element can be established. The coupling element is also configured with two sides with a fastening surface at its first side and a pin receiver for the connecting pin of the basic element at its second side, while the coupling element has an opening in which the pin receiver is arranged in a springy manner.

A sealing sleeve out of plastic material for the use on metal studs in the wall construction for the protection of wires, cables, conduits and the like is described in U.S. Pat. No. 5,537,714 A. The sealing sleeve includes a cylindrical body with an enlarged flange on one end with radially projecting spring snaps on the exterior of the body whereby the sealing sleeve may be inserted in a hole of the size of the web, wherein the hole edge is captured between the locking snaps and the flange. On the other side of the flange, there are diametrically opposed axially projecting spring fingers. The flange also includes two diametrically opposed holes wherein the fingers and holes are positioned so that two sealing sleeves can be joined flange-to-flange by axially rotating one with respect to the other.

U.S. Pat. No. 4,656,689 A also relates to a sealing sleeve for protecting a conduit passing through a wall opening and for providing an air seal between the conduit and the edge of the wall around the wall opening. The sealing sleeve has a relatively stiff fastener portion with projections extending therefrom and locking devices at the ends of the projections for engaging the edges of the wall around the wall opening. An elastomeric sealing portion receives the projections and has an opening with smaller dimensions than the outside dimensions of the conduit.

A method for forming a thru-hole through a composite structure having a plurality of internal compartments is described in U.S. Pat. No. 8,409,395 B2. An insert ring is connected to the composite structure to create a protecting layer around the periphery of a penetration which is formed within the composite structure. An adhesive is arranged between the composite structure and the insert ring to create a fluid-tight seal between the insert ring and the internal compartments.

Finally, DE 10 2017 122 236 A1 describes a fastening system for fastening a component at a carrier component. The fastening system includes a fastening stud being pluggable through a thru-opening of the component and fastenable in a fastening bore of the carrier component as well as an outer sleeve and an inner sleeve that is stored axially movably in a thru-opening of the outer sleeve, wherein the inner sleeve forms a thru-opening for the fastening stud in which the fastening stud is stored axially movably. Furthermore, the fastening system includes a spring disc pluggable onto the outer sleeve which is configured for attaching to a first side of the component in the fastened state, and a second spring disc that is also pluggable onto the outer sleeve, which is configured for attachment in the fastened state to a second side of the component opposite to the first side.

A disadvantage of these known arrangements is the effort regarding assembly and production as well as the lacking damping effect for both axial as well as radial oscillations/vibrations.

A vehicle body mount arrangement with a first and a second retainer defining a core structure with replaceable elastomeric bodies thereon is described in US 2006/244188. A mounting plate is provided between the elastomeric bodies for securing the assembly to a vehicle frame. A retaining clip assists in holding the assembly in the frame while fasteners are fastened to the frame.

A further device for connecting two components is described in DE 199 16 098 A1. The device includes a two-part elastic decoupling element which penetrates a receiving bore upstream of the component and receives the component between its element parts and a connecting means penetrating the decoupling element, which is fastenable in the other component and clamps the decoupling element at the other component.

U.S. Pat. No. 4,530,491 A describes a damping arrangement. Here, axial loads and movements on a uniform elastomeric body of the retainer lead to a compressive deflection and a bulging of a first ring-like part of the body in two directions and a shear of deflection of a second tubular part of the body. The second part of the body also imparts lateral stability to the retainer.

A bushing assembly for use in a hinge for a vehicle seat arrangement is described in U.S. Pat. No. 4,883,319 A and includes a pair of identical locking sleeves, each having a pair of opposing tangs extending in an axial direction from an annular portion. Each tang portion has a shoulder which is radially outwardly directed and is deflectable. The shoulders at the tang portions engage into corresponding recessed ledges on the interior wall of the annular portion of the opposite sleeve so as to snap fit together to form an integrated bushing assembly through which a hinge pin is passed.

US 2010/0086377 A1 describes a vibration isolating fastener insert structure which is configured so as to be partially or wholly snugly receivable in a hole in a plate. The fastener insert structure includes a rigid cylindrical hub having an externally extending flange and a continuous longitudinal opening suitable for receiving a fastening element as well as an elastomeric bushing snugly being carried or formed around said hub and having a slot therein receiving the outer flange. Furthermore, the structure includes an upper housing and a lower housing.

A shock dampener is known from CN 111140612 A having a connecting plate, a connecting stud, a first vibration damping arrangement and a second vibration damping arrangement. The first vibration damping arrangement includes a first sleeve and a first vibration damping part covering the first sleeve. The second vibration damping arrangement includes a second sleeve and a second vibration damping part covering the second sleeve. The connecting stud passes through the first sleeve, the second sleeve and the connecting plate one after the other.

A vibration absorber is described in DE 10 2019 107 885 A1. The vibration absorber includes an absorber mass with an opening and at least two spring devices being inserted into the opening. Each one of the spring devices includes at least one elastomeric spring element and a carrier body, wherein the carrier body receives the spring element. The carrier body includes an insertion portion for inserting the carrier body and the spring element into the opening, which is arranged in an inclined manner with respect to a longitudinal axis of the vibration absorber.

EP 2 980 437 A1 describes a vibration damping fastening system with a thread bolt with a bolt head, a housing with a bore for the form-fit fastening of the thread bolt, a flange with an outlet coaxial to the bore for the thread bolt, and elastic elements between the flange and the housing and/or between the thread bolt with the bolt head and the flange. The elastic elements contain whole metal pillows.

JP 2014-095441 A1 suggests a vibration control bushing including an inner cylinder part being formed of metal and into which a column part of a screw is inserted, an outer cylinder part which is formed by using rubber and which is fastened at an exterior surface of the inner cylinder part, and a flat washer part which is fastened at a surface opposite to the head part of the screw of the outer cylinder part. A notch part into which a retainer is inserted is provided at an exterior surface of the outer cylinder part in the circumferential direction. When fastening a screw, the outer cylinder part is pressed together, wherein the head part of the screw and an adapted body with the flat washer part lie in between and the side surfaces of the notch part contacts both surfaces.

Finally, from EP 1 054 386 A2, a method of attaching a floating vibration washer with a sleeve at a heat insulating plate with an insertion hole for the fastening screw is known. The method includes the arranging of the metallic damping element at an inner side and a peripheral edge section of the insertion hole for the fastening screw, the inserting of a male sleeve of a male flat washer or female sleeve at a female flat washer, respectively, into the bolt insertion hole from both sides of the heat insulating plate as well as the attaching and the fastening of the male flat washer and the female flat washer at each other with a fastening portion, which is provided at the male sleeve and/or the female sleeve, so that the heat insulating plate is held in a contact-free state both with the male flat washer as well as with the female flat washer.

These fastening arrangements with damping effect all have the same high assembly and manufacturing effort.

Based on these known fastening arrangements with damping effect or damping arrangements, respectively, it is therefore an object of at least some implementations of the present disclosure to provide an improved damping arrangement, which is intended to be fastened without tool and be used with different material thicknesses. It is also an object of at least some implementations of the present disclosure to provide a facilitated manufacturing method for such a damping arrangement.

SUMMARY

The above object is solved by a damping arrangement, a first component with the damping arrangement, a component connection, a manufacturing method of a damping arrangement as well as a connecting method. Further embodiments and developments result from the subsequent description, the drawings as well as the appending claims.

A damping arrangement is fastenable in an opening of a first component. Furthermore, a dampened connection of the first component with a second component is realizable with the damping arrangement. In a first alternative, the damping arrangement may include two identically constructed damping elements, wherein each damping element includes: a head portion with a first outer diameter, a shaft portion with a second outer diameter that is smaller than the first outer diameter and extends from a bottom side of the head portion, as well as a central first thru-opening, and only one sleeve with a central second thru-opening being arranged at least partly in the central first thru-opening of each damping element by means of a frictional and/or cohesive/material/substance-to-substance connection, so that the two identically constructed damping elements with bottom sides facing each other of the head portion with the first component arranged in between are fastenable to one another by means of the only one sleeve.

In the following, the use of the damping arrangement is explained for the better comprehensibility of the disclosure. In this context, a main feature of this alternative is that the damping arrangement consists of two identically constructed damping elements as well as only one sleeve. The damping arrangement thus includes three components. A connection between the two damping elements is achieved by holding the only one sleeve in the central first thru-opening of each sealing element by means of a frictional and/or material connection. Therefore, no locking structures for fastening the damping elements in the opening of the first component or for fastening the damping elements at each other is provided. In a further embodiment, the damping element may be configured round or oval. In this context, the oval design may be in order to realize a different damping in different directions.

For the spatial orientation, a longitudinal axis of the damping arrangement is defined by the central first thru-openings of the identically constructed damping elements. In other words, an insertion direction of a connecting element, as for example a connecting screw or a bolt, passes through the central first thru-openings of the identically constructed damping elements as well as the central second thru-opening of the only one sleeve along the longitudinal axis of the damping arrangement.

In use, firstly, the two identically constructed damping elements are provided which are intended to be fastened in an opening of a first component, e.g. an opening in an assembly flange of a vibration-generating pump or the like. Alternatively, the first component can also be a cable or cord channel which is intended to be fastened at a vehicle body as exemplary second component. An exemplary component thickness of the first component in the portion of the opening lies between 1 and 3 mm.

In a first step, one of the damping elements with the only one sleeve being at least partly arranged in the central first opening is provided. For this purpose, the only one sleeve is inserted into the central first thru-opening particularly from the end, which faces away from the head, of the shaft portion so that the only one sleeve is only partly arranged in the central first thru-opening. Due to the friction-fit and/or material-fit arrangement of the only one sleeve in the central first thru-opening, the sleeve is fastened there loss-proof The remaining and thus non-inserted part of the only one sleeve projects from the shaft portion of the first damping element.

The first damping element which has been prepared in this manner with the only one sleeve extending over the shaft portion is now arranged in the opening of the first component. In this context, the dimensioning of the opening in the first component is such that at least a part of the shaft portion extends into the opening in the first component. In turn, an outer diameter of the head portion is selected big enough so that the damping element abuts the first component adjacent to the first opening. The abutment surface or abutment edge which is formed in this way defines an abutment plane at the first component, the plane being aligned rectangularly to the longitudinal axis of the damping arrangement. In one configuration, the abutment surface or abutment edge is configured continuously. In an alternative configuration, the abutment surface or abutment edge is formed partially, e.g. with breakthroughs or something similar. As the shaft portion may be formed cylindrically or ovally at its outer side, without any locking features or the like, and may be neither arranged in the press-fit in the component opening, the damping element which is arranged in the component opening is not arranged in there loss-proof. Rather, the first damping element with the only one sleeve may be arranged loosely in the component opening of the first component.

In order to limit the inserting of the respective damping element into the opening in the first component, i.e. to achieve a defined insertion depth, a projection projecting radially outwardly can be provided in the shaft portion at the outer side. This projection can be present continuously or non-continuously. Alternatively, this function can also be realized by the providing of two or more radially outwardly projecting projections providing a further abutment surface at the component surface in the shaft portion beside the abutment surface or abutment edge of the head portion.

After having arranged the first of the two identically constructed damping elements with shaft portion extending into the opening in the first component at the first component side, the other one of the two damping elements is analogously arranged at the opposite second component side for the fastening of the first damping element. As both damping elements are identically constructed and are inserted with sides facing each other or ends of the shaft portion facing away from the head, into the component opening of the first component, the free end, i.e. the part which extends over the shaft portion of the first damping element, of the only one sleeve is now fastened in the central first thru-opening of the second damping element by means of a frictional and/or material connection. In this way, the resulting damping arrangement is fastened loss-proof in the opening of the first component. In this state, the sides, which face away from the head, of the shaft portions of the two damping elements may abut each other. For this purpose, the end, which faces away from the head, may be configured flat in the shaft portion of each damping element. This construction becomes clear later, with respect to the various embodiments.

After the preassembly of the fastening arrangement which has been carried out in this manner, a second component is provided. This takes place at the same production location or at another production location, depending on the desired course of the method. This is also explained in detail later.

An opening of the second component is aligned with the central first thru-openings of the damping elements and the central second thru-opening of the only one sleeve. After that, a connecting element, as for example a connecting screw or a bolt, is passed through the central first thru-openings and is fastened in a fastening portion which is provided in or adjacent to the second component. In doing so, the fastening may take place such that a compression of the respective damping element provides a damping effect for both axial as well as radial vibrations. For this purpose, the only one sleeve may have an axial length which is larger than the axial length of a damping element but smaller than the axial length of two damping elements. In this context, a material selection for the damping element must be effected such that on the one hand, a sufficient damping effect is provided while on the other hand, a necessary connecting stability is guaranteed at the same time. For this purpose, an elastomer or a thermoplastic elastomer may be suitable.

An advantage of this approach is that the manufacturing effort is reduced due to the little number of components as well as the use of identically constructed damping elements. Furthermore, a worker does not have to pay attention to the correct assignment of the damping elements in the course of the assembly. Therefore, the danger of a faulty assembly is also reduced by that. Furthermore, an automated installation is facilitated as solely the only one sleeve which may be already preassembled in a damping element must be plugged into a second damping element without sleeve.

A further advantage arises by the use of the only one sleeve because in this manner, a material selection for the damping element can be aligned more to the damping effect, as the stability of the damping arrangement which is reduced by that can be compensated due to the stabilizing effect of the only one sleeve. The only one sleeve may be formed of metal or a thermoplastic material.

In a second alternative, a damping arrangement, which is fastenable in an opening of a first component and with which a dampened connection of the first component with a second component is realizable, may comprise two damping elements, wherein each damping element includes a head portion with a first outer diameter, a shaft portion with a second outer diameter being smaller than the first outer diameter and extending from a bottom side of the head portion, as well as a central first thru-opening, and comprises only one sleeve with a central second thru-opening which is arranged at least partly in the central first thru-opening of each damping element by means of a frictional and/or cohesive/material/substance-to-substance connection, so that the two damping elements with bottom sides of the head portion facing each other with the first component arranged in between are fastenable at each other by means of the only one sleeve. In contrast to the first alternative of the damping arrangement, the two damping elements do not have to be configured with an identical construction. This increases the variability of the damping arrangement with regard to its possible application fields. However, it may be in the frame of this alternative that the second axial ends which face one another of the damping elements abut each other in the assembled state, but do not have any locking features. That means that also in this alternative, a loss-proof fastening of the damping elements in the component opening of the first component is realized mainly, which may be exclusively, by means of the only one sleeve. With respect to the use, the above embodiments regarding the first alternative of the damping arrangement therefore apply analogously.

In further embodiment of the damping arrangement, the central first thru-opening comprises a radially inwardly projecting projection adjacent to an upper side of the head portion.

In a first alternative, the radially inwardly projecting projection may serve for forming a partial, axial abutment surface or abutment edge for the only one sleeve. In this manner, it is guaranteed that the only one sleeve is inserted into the central first thru-opening up to a defined position. In this embodiment, the axial length of the only one sleeve may correspond to the double of the length between the end of the shaft portion which faces away from the head and the portion in the central first thru-opening with reduced inner diameter. With respect to a round, central first thru-opening, it thus includes an inner diameter adjacent to the upper side of the head portion which is smaller than the outer diameter of the only one sleeve. This reduction of the inner diameter adjacent to the upper side of the head portion takes place for example by means of a step, a chamfer or a combination of the two. The corresponding projection can be configured continuously or non-continuously. Alternatively, and with respect to a central first thru-opening which is configured non-round in connection with a non-round sleeve, the corresponding abutment surface or abutment edge can be formed by a projection which faces radially inwardly with respect to the longitudinal axis of the damping element. In this case, the provision of the abutment surface or abutment edge also takes place by means of a step, a chamfer or a combination of the two. The providing of a chamfer in order to provide an abutment surface or abutment edge for the only one sleeve has the advantage that in the later use, the behaviour of the damping element is improved in case of a compressing, a shearing of material of the damping element by the only one sleeve may be avoided.

In a second alternative, the radially inwardly projecting projection may serve as an additional fastening feature, which may be in connection with the only one sleeve having a circumferential flange adjacent to an axial end having only one sleeve. This is made clear later in the discussion of the corresponding detailed embodiment.

The head portion at the radial outside, each damping element may include a projection extending parallel to the shaft portion. This projection serves as an abutment surface at the component upper side adjacent to the opening of the first component. For increasing the stability in the head portion of the damping element, it may be in the frame of this embodiment that between the shaft portion and the projection, a plurality of ribs may be provided at the bottom side of the head portion. A plurality of first and/or second breakthroughs, which may be round breakthroughs, be provided in the head portion of the damping element. Here, the plurality of first breakthroughs may be arranged annularly in the outer portion of the head portion, while the plurality of second breakthroughs may be arranged in a radial inner portion of the head portion, i.e. adjacent to the central first thru-opening. The second breakthroughs therefore may also extend through the shaft portion up to the second axial end of the damping element. The providing of the breakthroughs also offers the advantage, same as the providing of the ribs, that the stability of the damping element is increased.

In a further embodiment of the damping arrangement, each damping element includes a plurality of radially inwardly projecting projections in the central first thru-opening, which realize the frictional connection to the only one sleeve. In this way, the only one sleeve is arranged in the central first thru-opening of the respective damping element by means of press-fit. In the assembly, firstly, the only one sleeve can then be attached/fastened in a loss-proof manner in a first of the two damping elements. This first or prepared damping element with the only one sleeve that is fastened in there in a loss proof manner is inserted into the opening in the first component from one side with the projecting part of the only one sleeve and a part of the shaft portion. When plugging-on the remaining second damping element from the opposite component side into the opening in the first component, the same is also mounted/fastened on the only one sleeve in a loss-proof manner. Thus, the processing of the respective damping arrangement is facilitated and an automated processing may be supported.

Advantageously, each damping element may have a shore A hardness between 40 and 80 shore A. This configuration may lead to the damping element having damping properties that are adapted to the respective application field.

According to a further embodiment, the only one sleeve has a plurality of breakthroughs according to a first alternative, through which the material of the damping element projects radially inwardly. This configuration may be suitable when producing the damping elements by means of injection-molding, so that a first damping element with sleeve being arranged in there in a loss-proof manner can be produced. In this way, the only one sleeve may also be fastened effectively already when producing one of the two damping elements in the corresponding damping element in a loss-proof manner and the separate step of the inserting of the only one sleeve into one of the damping elements can be omitted. In the remaining second damping element, the only one sleeve can be fastened by means of press-fit in the above described manner. In use, the only one sleeve is therefore inserted into the second damping element in the usual way and fastened there by means of a frictional and/or material connection.

According to a second alternative, the only one sleeve has a peripheral or circumferential flange or collar adjacent to an axial end of the only one sleeve. The advantage of this configuration may arise in the later use. Thus, due to the flange of the only one sleeve, no separate disc between a head of a connecting element and the damping element is necessary. Thus, this facilitates the establishing of a connection between the two components further.

A first component includes a damping arrangement being arranged in a component opening of the first component. The first component is for example a pump, such as a vacuum pump, wherein the damping arrangement is preassembled in an opening of an assembly flange. Alternatively, to the pump, the first component can also be a cord or cable channel or something similar, which is supposed to be fastened with a dampened storage for example at a vehicle body as a second component. A material thickness of the first component adjacent to the component opening may be between 1 and 3 mm. With regard to the resulting technical effects and advantages, reference is made to the above descriptions regarding the damping arrangement, in order to avoid repetitions.

A component connection comprises a first component as well as a second component with a second opening and a connecting element, wherein the connecting element extends through the damping arrangement and engages with a fitting fastening portion in or adjacent to the second component. This assembly illustrates that with the damping arrangement, a releasable fastening, e.g. a screwing, may be realized, wherein in a further embodiment, the only one sleeve of the damping arrangement abuts the components in the firmly connected state of the two components, so that a block screwing can be realized. It follows from that that a length or axial extension of the only one sleeve in the longitudinal direction of the damping arrangement may be less than an axial extension of the damping elements in the longitudinal direction of the damping arrangement. With respect to the component connection, too, reference is made to the above explanations regarding the damping arrangement.

In a further embodiment of the component connection, a radial tolerance compensation during the establishing of the component connection is realizable by the fact that the only one sleeve has an inner diameter which may be larger than the outer diameter of the connecting element. By that, the fastening of the two components at each other may be facilitated, either by a worker or automatically.

Finally, in a further embodiment of the component connection, the connecting element includes a head and a shaft and a disc is provided between the head of the connecting element and the adjacently arranged damping element of the damping arrangement, wherein an outer diameter of the disc is larger than an inner diameter of the opening in the first component. In this way, the fastening strength does not only have an effect on the damping arrangement but also on the first component. Furthermore, the disc that is dimensioned in this way may prevent a complete releasing of the first component from the second component in case of a failure of the damping arrangement.

A manufacturing method of a damping arrangement includes the steps: providing two, which may be identically constructed, damping elements, providing only one sleeve, arranging the only one sleeve in one of the two, which may be identically constructed, damping elements first and after that in the remaining damping element, so that the two, which may be identically constructed damping elements, with a first component being arranged in between, are fastenable at each other by means of the only one sleeve. As can be recognized based on the above steps, the damping arrangement is provided by means of the manufacturing method. For avoiding repetitions, reference is therefore made to the explanations regarding the damping arrangement.

In a further embodiment of the manufacturing method, the sleeve may consist of a metal or a thermoplastic. The sleeve may consist of an electrically conductive material, which may be of an electrically conductive thermoplastic with or without fibre reinforcement. By means of the choice of the respective material, the damping arrangement is adapted to the desired application field.

In a further embodiment of the manufacturing method, the providing of one of the two, which may be identically constructed damping elements takes place by overmolding the only one sleeve with a material of the damping element with a shore A hardness between 40 and 80 shore A. By means of this approach, the only one sleeve is overmolded when injection-molding the damping element. In this context, the damping element may be produced by means of vulcanization or extrusion instead of the injection-molding. In this context, the only one sleeve may include a plurality of breakthroughs. In this way, the only one sleeve may be fastened in a safe manner at one of the damping elements, as is explained above.

A connecting method of a first component with a second component includes the steps: providing a first component with damping arrangement arranged therein, such as a first component, or providing a first component and a damping arrangement as well as arranging the damping arrangement in an opening of the first component, after that, arranging a second component with a second component opening in alignment with the first component opening and inserting the connecting element, so that the connecting element engages with a fitting fastening portion in or adjacent to the second component. Thus, the component connection can be established with the connecting method. With respect to the arising technical effects and advantages, reference is therefore made to the above explanations.

BRIEF DESCRIPTION OF THE DRAWINGS

In the following, the present disclosure is described in detail with respect to the drawings. In this regard, same reference numerals in the drawings refer to same components and/or elements. They show.

DETAILED DESCRIPTION

An embodiment of a damping arrangement 1 consists of two identically constructed damping elements 10 as well as of only one sleeve 50. Further components or elements may not be necessary for securing the damping arrangement 1 in an opening of a first component A. For the better comprehensibility, firstly, an embodiment of a damping element 10 is explained with reference being made to FIGS. 1 to 7.

Figure 4:
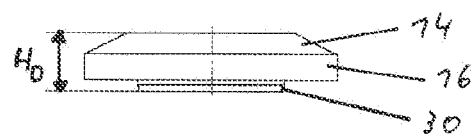
FIG. 4 a lateral view of the damping element of FIG. 1.
Figure 5:
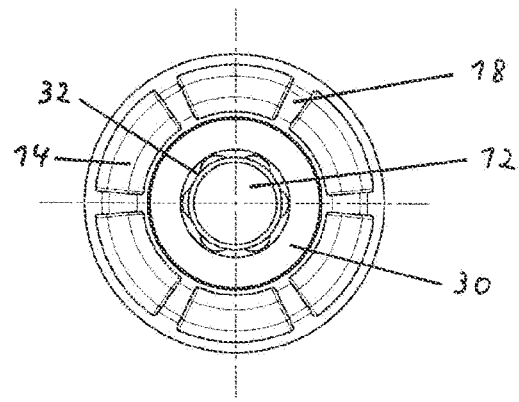
FIG. 5 a view of the damping element of FIG. 1 from below.

The damping element 10 may be configured disk-like and includes a central first thru-opening 12 with an inner diameter $D_I$, a head portion 14 as well as a shaft portion 30. In the known manner, the head portion 14 includes an upper side as well as a bottom side and has an outer diameter $D_{AK}$ (see FIG. 3). The shaft portion 30 with an outer diameter $D_{AS}$ extends from the bottom side of the head portion 14, which has an end facing the head and an end facing away from the head for this purpose. A first axial end of the damping element 10 is thus defined by the upper side of the head portion and a second axial end of the damping element 10 by the end, facing away from the head, of the shaft portion 30. An axial height $H_D$ of the damping element is thus measured between the upper side of the head portion 14 adjacent to the central first thru-opening 12 and the second axial end, as is shown in FIG. 4. The second axial end may include a chamfer at the radial outer side. This facilitates the inserting of the damping element 10 into the component opening of the first component.

Figure 1:
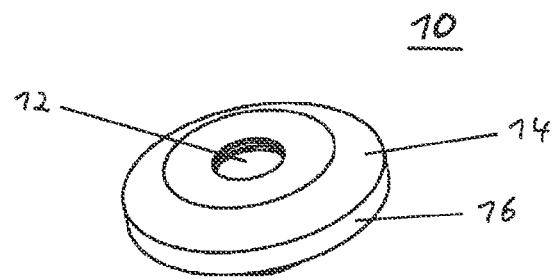
FIG. 1 a perspective view of a first damping element from above.
Figure 2:
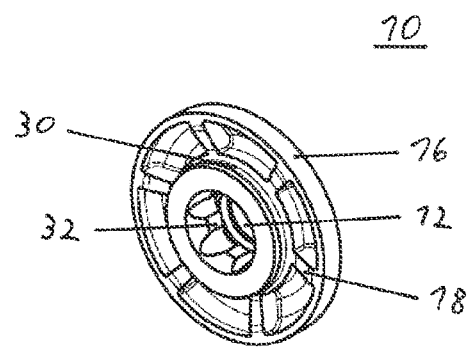
FIG. 2 a perspective view of the damping element of FIG. 1 from below.
Figure 3:
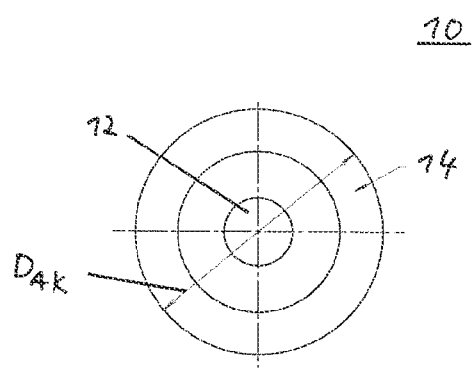
FIG. 3 a top view on the damping element of FIG. 1.
Figure 6:
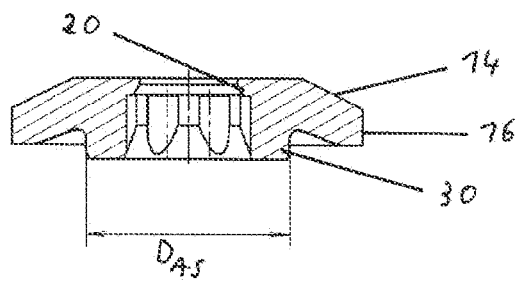
FIG. 6 a sectional view of a first embodiment of the first damping element.
Figure 7:
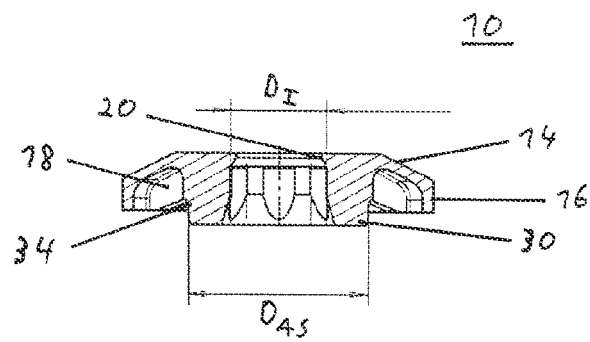
FIG. 7 a sectional view of a second embodiment of the first damping element.

The upper side of the head portion 14 is configured plane adjacent to the thru-opening 12. In the further course radially outwardly, the head portion 14 is configured in an inclined manner in the direction of the shaft portion 30. At the end of this inclined portion, a projection 16 is present which extends parallel to the longitudinal axis or to the shaft portion 30, respectively, of the damping element 10 from the upper side in the direction of the end, facing away from the head, of the shaft portion 30. As can be seen later, a bottom side of this projection 16 which may serve as abutment surface at the first component A adjacent to the opening in the first component A. Furthermore, ribs 18 for reinforcing the head portion 14 and thus the damping element 10 are provided at the bottom side of the head portion 14. In the present example, six ribs 18 are provided which are spaced from each other evenly, as can be seen in FIG. 2. For the better comprehensibility of the construction, FIGS. 6 and 7 show a sectional view of the damping element 10, wherein the cut in FIG. 6 was made through the ribs 18, but not in FIG. 7.

As already mentioned above, the shaft portion 30 extends from the bottom side of the head portion 14. The shaft portion 30 has a cylindrical form at the outside which can contain steps, as is shown in FIG. 7. The steps serve for the facilitated inserting of the damping element 10 into the opening in the first component A as well as for the avoiding of notch effects during the contact between the first component A and the damping element 10. Furthermore, the steps provide an abutment surface 34, which in use abuts the component surface in addition to the bottom side of the projection 16 in the head portion. Thus, an insertion depth of the damping element 10 into the component opening is defined and limited in this way.

In the illustrated embodiment, the central first thru-opening 12 includes projections 32, which are present at least in the shaft portion 30. By means of these projections 32, a reduction of the inner diameter $D_I$ of the central first thru-opening 12 is achieved, due to which a sleeve 50 that is later inserted therein can be fastened in there in a frictional and thus loss-proof manner. The damping element 10 includes a portion 20 with reduced inner diameter $D_{IV}$ adjacent to the upper side of the head portion 14. The portion 20 with, in case of a central first thru-opening 12 being configured round, reduced inner diameter $D_{IV}$ can be provided by a step, a chamfer or a combination of the two. In FIG. 6, the portion 20 with reduced inner diameter is provided by a step in connection with a chamfer. The step which may be thereby formed serves as a partial, axial abutment surface or abutment edge for the only one sleeve 50 so that the only one sleeve 50 may be arrangeable in a defined depth in the damping element 10. In the embodiment according to FIG. 7, the portion 20 with reduced inner diameter $D_{IV}$ is provided by a chamfer. This includes the further advantage that in case of a compression of the damping element 10, the danger of a shearing-off of this portion of the damping element 10 is reduced by the only one sleeve 50. In this context, it should generally be considered that beside the completely circumferential configuration of the portion 20, the same effect is achievable by non-continuous projections or the like, as long as a limitation of the insertion depth for the only one sleeve 50 is provided.

Due to the outer diameter $D_{AK}$ of the head portion, which is larger than a diameter of the opening in the first component A, it is guaranteed when using the damping element 10 that the respective damping element 10 does not fit through the opening in the first component A but abuts the edge portion of the opening. Thus, in use, the bottom side of the head portion 14 is arranged adjacent to the first component A. The opposite upper side of the head portion 14 is arranged adjacent to a connecting element, such as a connecting screw 3 or an associated disc 5, in the later component connection. In this state, the shaft portion 30, the outer diameter $D_{AS}$ of which may correspond to the diameter of the opening in the first component A, extends at least partly into the opening in the first component A and abuts with its second axial end to the second axial end of the second damping element 10 that is arranged on the opposite component side.

For providing the desired damping function by the damping element 10, the same may be made of an elastomer or a thermoplastic elastomer, having a shore A hardness between 40 and 80 shore A. By means of the corresponding material selection, the damping element 10 and thus the damping arrangement 1 as a whole can be adapted to the desired application field. Possible application fields lie within a temperature range between −40° C. and 200° C.

Figure 8:
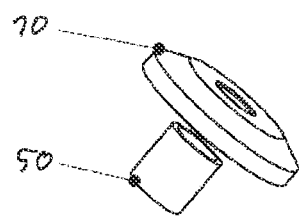
FIG. 8 a perspective view of the damping element of FIG. 1 as well as of a sleeve, FIG. 9 a sectional view of the damping element of FIG. 1 with sleeve inserted therein, FIG. 10 a first embodiment of the damping arrangement, FIG. 11 a sectional view of an embodiment of a first component with damping arrangement according to FIG. 10 arranged in there, FIG. 12 a sectional view of an embodiment of a component connection, FIG. 13 a perspective view of the damping element of FIG. 1 as well as of an alternative sleeve, FIG. 14 a perspective view of a second damping element, FIG. 15 a top view onto the second damping element according to FIG. 14, FIG. 16 a perspective view of the damping element of FIG. 14 as well as of a sleeve, FIG. 17 a sectional view of the damping element of FIG. 14 with sleeve inserted therein, FIG. 18 a second embodiment of the damping arrangement, FIG. 19 a sectional view of an embodiment of a first component with damping arrangement of FIG. 18 arranged in there, FIG. 20 a perspective view of a third damping element, FIG. 21 a top view onto the third damping element according to FIG. 20, FIG. 22 a perspective view of the damping element of FIG. 20 as well as of a sleeve, FIG. 23 a sectional view of the damping element of FIG. 20 with sleeve inserted in there, FIG. 24 a third embodiment of the damping arrangement, FIG. 25 a sectional view of an embodiment of a first component with damping arrangement of FIG. 24 arranged in there, FIG. 26 a perspective view of a fourth damping element, FIG. 27 a top view onto the fourth damping element according to FIG. 26, FIG. 28 a perspective view of the damping element of FIG. 26 as well as of a sleeve, FIG. 29 a sectional view of the damping element of FIG. 26 with sleeve inserted in there, FIG. 30 a fourth embodiment of the damping arrangement, FIG. 31 a sectional view of an embodiment of a first component with damping arrangement of FIG. 30 arranged in there, FIG. 32 a flow diagram of an embodiment of a manufacturing method of a damping arrangement, and FIG. 33 a flow diagram of an embodiment of a connecting method.
Figure 9:
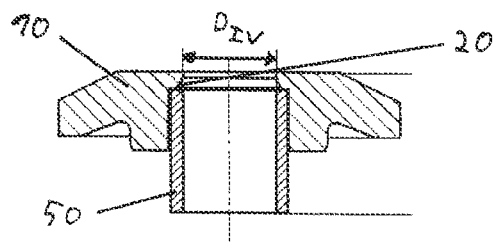

With reference to FIGS. 8 and 9, a damping element 10 in connection with the only one sleeve 50 is now shown. In use, the only one sleeve 50 is arranged at least partly in the central first thru-opening 12 of the damping element 10. The arrangement of the sleeve 50 in the central first thru-opening 12 takes place, as is described above, by means of a frictional and/or material connection.

Furthermore, an axial extension or height of the sleeve 50 in longitudinal direction of the damping element 10 is larger than an axial height $H_D$ of the damping element 10. In order to maintain the damping properties, the axial height of the only one sleeve 50 is, however, smaller than the double of the axial height $H_D$ of the damping element 10. When the portion 20 with reduced inner diameter is present, the axial height of the sleeve 50 may be the same as the double of the distance between the step which is formed by the portion 20 with reduced inner diameter and the second axial end of the damping element 10. In this way, a compression of the damping element 10 in longitudinal direction of the damping arrangement 1 is implementable in case of a later block screwing where the only one sleeve 50 abuts the second component B on the one hand and the connecting screw 3 or associated disc 5, respectively, on the other hand.

As material for the sleeve 50, a metal or a thermoplastic is used. The material may be an electrically conductive material, e.g. a thermoplastic material with electrically conductive properties as well as with or without fiber reinforcement. As in the later use, the only one sleeve 50 abuts the second component on the one hand and a fastening element such as a connecting screw or a corresponding disc 5 on the other hand, the material selection takes place such that the sleeve 50 can take up the arising forces and transmit them.

Figure 10:
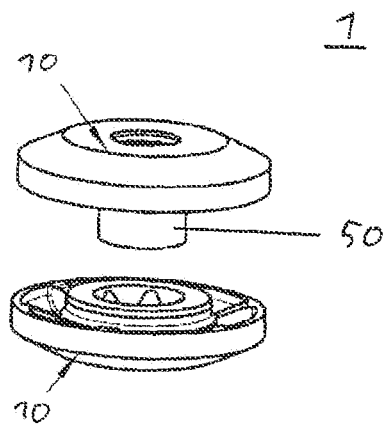

FIG. 10 shows an embodiment of a damping arrangement 1 consisting of two identically constructed damping elements 10 and the only one sleeve 50. A safe assembly of the damping arrangement 1 in the component opening of the first component A takes place via the only one sleeve 50, alone, which is at least partly arranged in the shaft portion 30 of each damping element 10. This is realized by providing the radially inwardly projecting projections 32 in the central first thru-opening 12, which may be in the shaft portion 30. In this way, it is guaranteed that the components damping element 10 and sleeve 50 of the damping arrangement 1 are fastened at each other in a loss-proof manner. Furthermore, in case of a pre-assembly of a sleeve 50 in a damping element 10 before the arranging of the damping element 10 in the opening of the first component A, the further processing may be facilitated, and the damping arrangement 1 may be processed in an automized manner.

Figure 11:
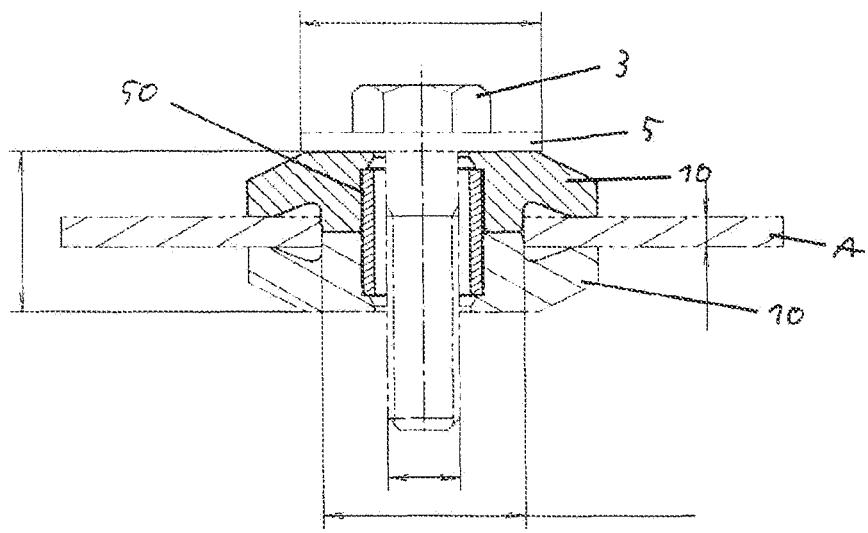
Figure 12:
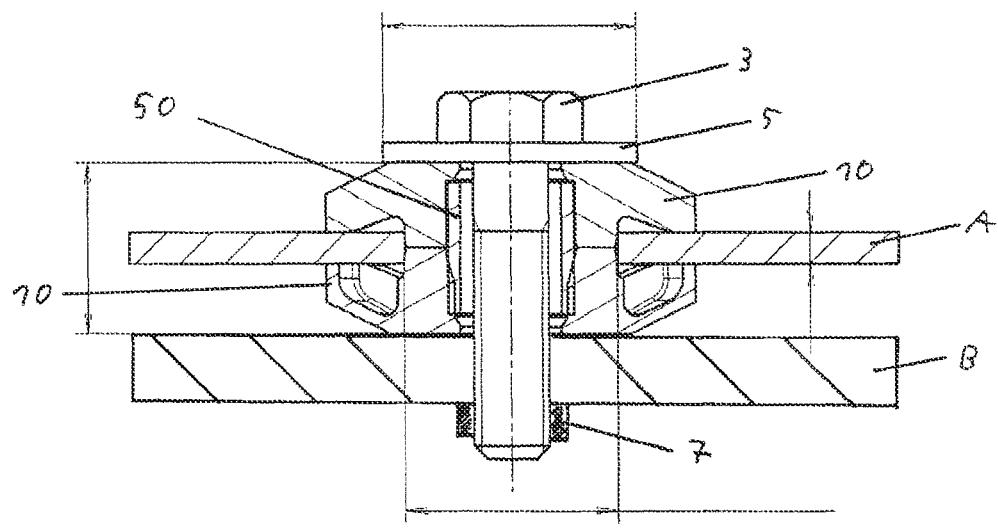

With reference to FIGS. 11 and 12, the manufacturing of a component connection by means of the damping arrangement 1 is explained. For this purpose, firstly, two identically constructed damping elements 10 are provided, which are intended to be fastened in an opening of a first component A, e.g. in an assembly flange of an oscillating-generating pump or a cord/cable channel. A material thickness of the first component adjacent to the component opening may lie between 1 and 3 mm. In a first step, the only one sleeve 50 is arranged in one of the damping elements 10, provided that not one of the damping elements 10 already includes the only one sleeve 50. After that, the damping element 10 which has been prepared in this manner with the only one sleeve 50 partly arranged in there is arranged adjacent to the opening of the first component A. The dimensioning of the outer diameter $D_{AS}$ of the shaft portion of the damping element 10 with respect to the opening in the component A is such that in this context, the shaft portion 30 of the damping element 10 extends into the opening in the first component A.

The outer diameter $D_{AK}$ of the damping element 10 in the head portion is in turn chosen such that the damping element 10 abuts the first component A adjacent to the first opening. The abutment surface which is configured in this manner defines an abutment plane at the first component A, which is rectangular with regard to the longitudinal axis of the damping arrangement 1.

Once one of the two identically constructed damping elements 10 with shaft portion 30 extending into the opening in the first component A has been arranged at a first component side, the other one of the two identically constructed damping elements 10 is arranged analogously at an opposite second component side. Both damping elements 10 are configured with an identical construction and may abut one another after plugging the second damping element 10 onto the only one sleeve 50 with the shaft portions 30 facing each other, i.e. they may abut one another with the axial ends facing one another and facing away from the head. The first component A may be arranged between the damping elements 10 and between the head portions 14.

An advantage of this approach is that the manufacturing effort for the component connection is reduced due to the use of two identically constructed damping elements 10. Furthermore, a worker may not have to pay attention to the correct assignment of the damping elements 10 during the assembly, when the only one sleeve 50 is not preassembled in one damping element 10. Therefore, the danger of a defective assembly is also reduced. Furthermore, the possibility of the automated installation is given. Ultimately, the two damping elements 10 are thus only fastenable at each other via the only one sleeve 50 with first component A arranged in between. In this state, a first component A with a pre-assembled damping arrangement 1 is thus present in a component opening of the first component A.

After the preassembly of the damping arrangement 1 which has been carried out in this manner, a second component B is provided. This takes place at the same production location or at another production location, depending on the desired course of proceeding.

An opening of the second component B is aligned with the central first thru-opening 12 of the damping element 10. After that, a connecting screw 3 as connecting element is guided through the central first thru-openings 12 and brought into engagement with a fastening portion 7 for the connecting screw 3, wherein the fastening portion 7 includes for example an inner thread and is provided in or adjacent to the second component B. A radial tolerance compensation is realizable by the fact that even in the portion 20 with reduced inner diameter, the only one sleeve 50 has an inner diameter that is larger than the outer diameter of the connecting screw 3. By that, the fastening of the two components A, B at each other may be facilitated, be it either by a worker or automatically.

An exemplary screwing takes place such that in an initial state, the only one sleeve 50 abuts an axial undercut in the central first thru-opening 12. When now, the connecting screw 3 is tightened in the second component, a compression of the respective damping element 10 provides a damping effect both for axial as well as radial oscillations or vibrations. This construction clearly shows that with the damping arrangement 1, a releasable screwing can be realized wherein in the tightly connected state of the two components A, B the only one sleeve 50 which may abut the second component on the one hand and on the other hand the connecting screw 3 or the associated disc 5, respectively, so that a block screwing may be present. The use of a disc 5 with an outer diameter that may be bigger than the outer diameter of the opening in the first component A which has proven advantageous. Because in this way, the first component A does not release itself from the second component B, even in case of a failure of the damping arrangement 1. Furthermore, the forces applied by the screwing on the damping arrangement 1 are distributed more evenly.

Figure 13:
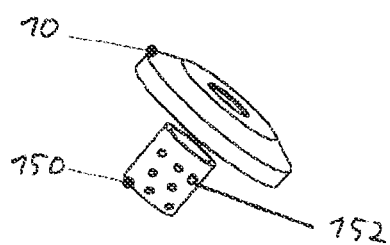
Figure 14:
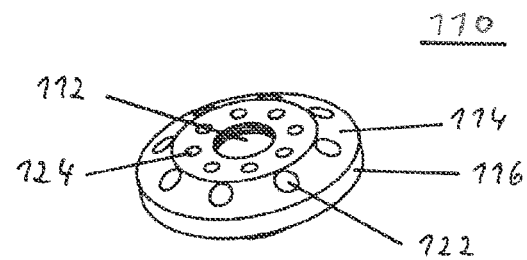
Figure 15:
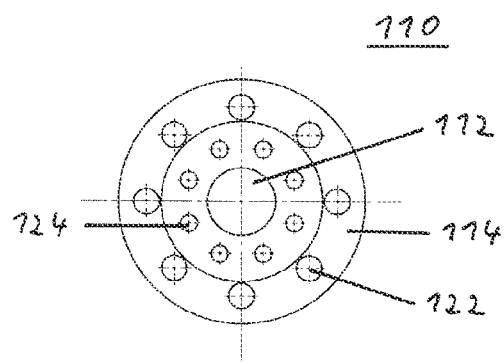
Figure 16:
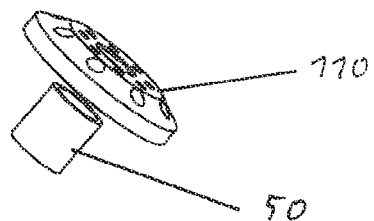
Figure 17:
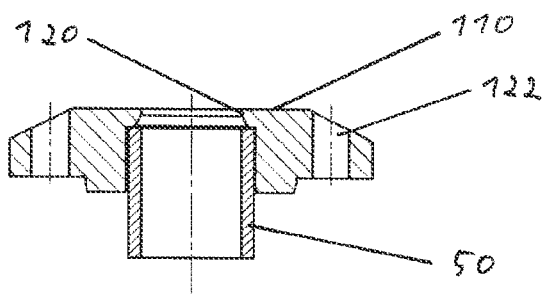

As can be seen in FIG. 13, the sleeve 150 can be configured with a plurality of breakthroughs 152 in an alternative embodiment, through which the material of the damping element 10 extends radially inwardly. In this way, the sleeve 150 can be provided in a loss-proof manner in a damping element 10. Furthermore, the manufacturing method of the damping arrangement is facilitated further by that, which becomes clear under consideration of the subsequent manufacturing method.

FIGS. 14 to 19 clarify a second embodiment of the damping arrangement 100. In the damping element 110, a plurality of first 122 and second breakthroughs 124, each of which being configured round, are provided in the head portion of the damping element 110 instead of the ribs 18 of the damping element 10. In the further design, the damping element 110 corresponds with the damping element 10. Thus, the damping element 110 comprises the central first thru-opening 112 as well as the head portion 114 with the projection 116. The portion 120 with reduced diameter is formed adjacent to the upper side of the head portion 114.

Figure 18:
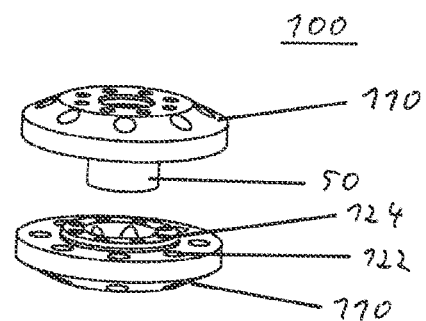
Figure 19:
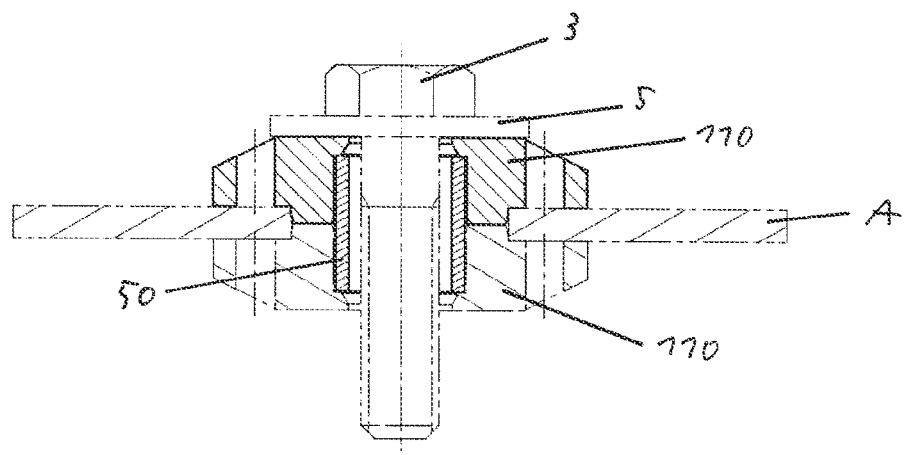
Figure 20:
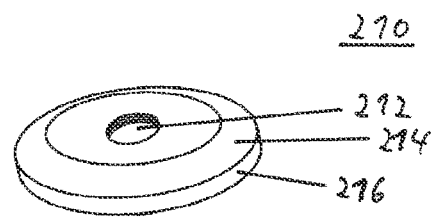
Figure 21:
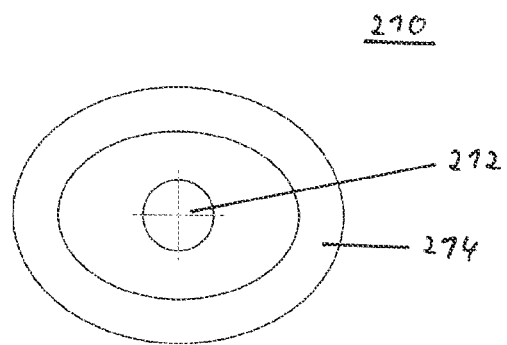
Figure 22:
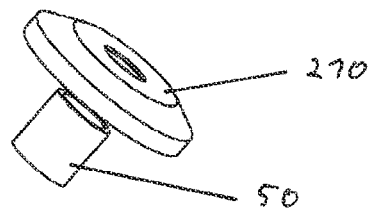
Figure 23:
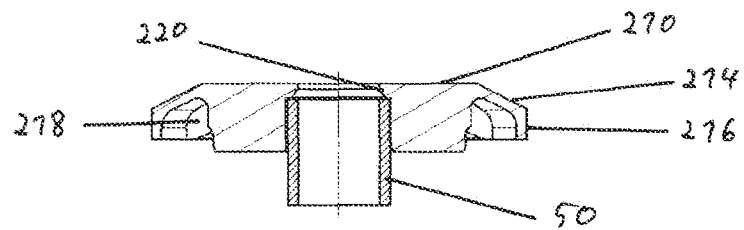
Figure 24:
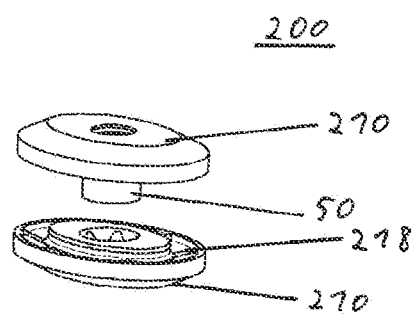
Figure 25:
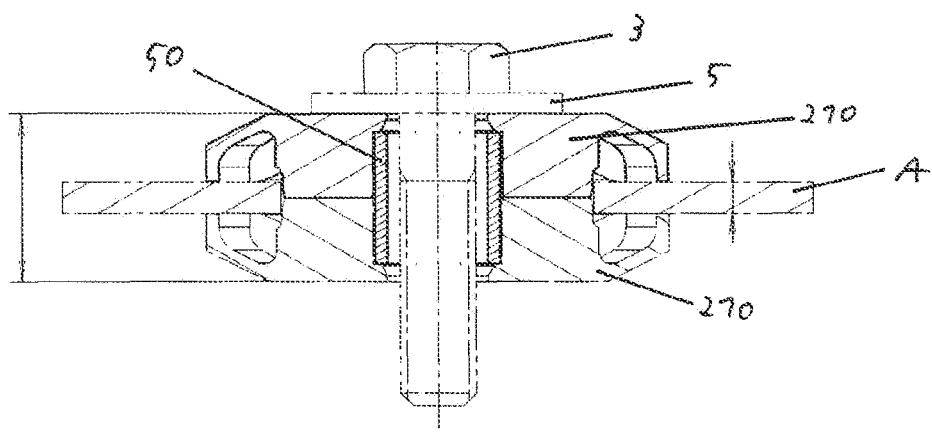
Figure 26:
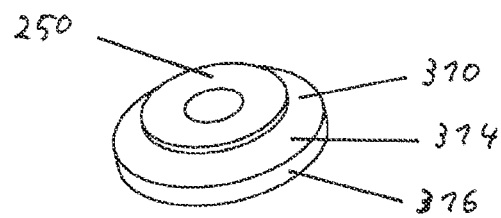
Figure 27:
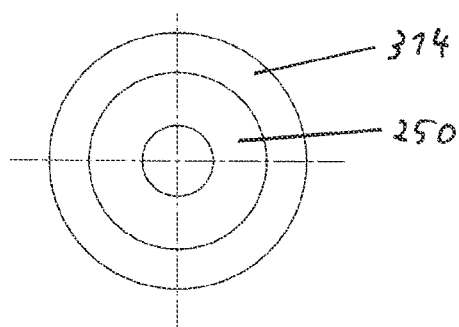
Figure 28:
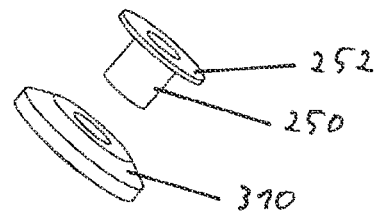
Figure 29:
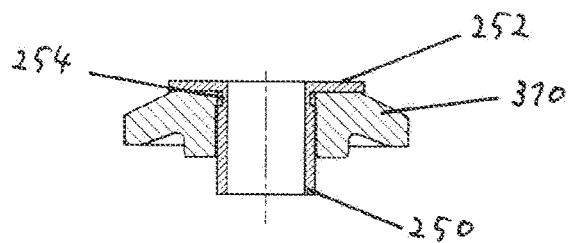
Figure 30:
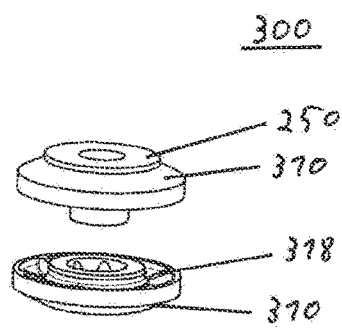
Figure 31:
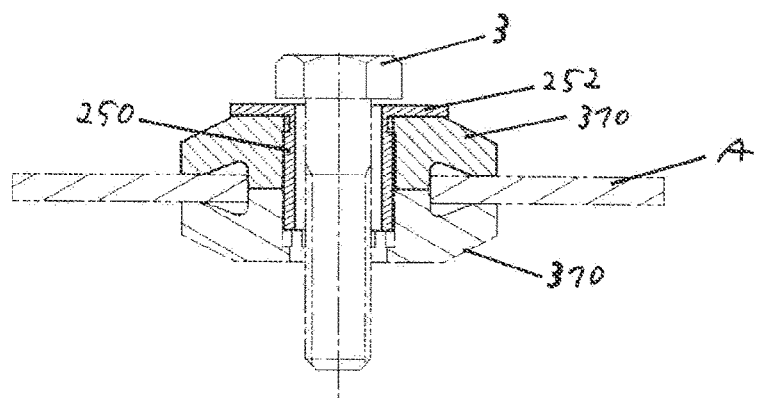

The plurality of first breakthroughs 122 is arranged annularly in the outer portion of the head portion 114. In the same manner, the plurality of second breakthroughs 124 is arranged in a radial inner portion of the head portion 114, i.e. adjacent to the central first thru-opening 112. As can be seen in FIG. 18, the second breakthroughs 124 may also extend through the shaft portion 30 up to the second axial end of the damping element 110. The providing of the breakthroughs 122 and 124 also provides the advantage that the stability of the damping element 110 is increased.

A third embodiment of the damping arrangement 200 is shown in FIGS. 20 to 25. In contrast to the previous embodiments, here, the damping element 210 is not configured round but oval. Due to the oval design, a different damping in different directions can be realized. Apart from that, the damping element 210, same as the previous embodiments, includes the central first thru-opening 212 as well as the head portion 214 with the projection 216. Likewise, ribs 218 are provided at the head bottom side. Adjacent to the upper side of the head portion 214, the portion 220 with reduced diameter is formed.

Finally, FIGS. 26 to 31 show a fourth embodiment of the damping arrangement 300. The damping element 310 includes, same as in case of the previous embodiments, the central first thru-opening 312 as well as the head portion 314 with the projection 316. Likewise, ribs 318 are provided at the head bottom side.

The damping arrangement 310 may distinguish from the previous embodiments with regard to the only one sleeve 250. In this embodiment, it has a circumferential collar 252, so that in the later use, no disc between the head of the connecting element 3 and the damping element 310 is necessary. In order to achieve a secure fastening of the sleeve 250 in the damping element 310, the sleeve 250 may have a recess 254 which interacts with a corresponding projection of the damping element 310. A fastening of the second damping element 310 takes place in the known manner on the piece of the only one sleeve 250 which projects from the first damping element 310.

Figure 32:
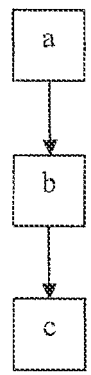

Now, with respect to FIG. 32, a schematic course of procedure of a manufacturing method of a damping arrangement 1 is illustrated. Here, two identically constructed damping elements 10 are provided in a first step a. Before that, at the same time or after that, a providing of only one sleeve 50 takes place in step b as well as an arranging of the only one sleeve 50 in one of the damping elements 10 first and subsequently, in the remaining damping element 10 in step c.

The providing of the damping elements 10 in step a can be effected by injection molding of the damping elements 10. Alternatively, the damping elements 10 can also be manufactured by means of vulcanization or extrusion. Principally, different manufacturing methods are possible. On the one hand, the damping elements 10 and the only one sleeve 50 can be provided separate of each other so that in step c, an inserting of the only one sleeve 50 into one of the damping elements 10 first and subsequently into the remaining damping element 10 takes place.

Alternatively, firstly, the only one sleeve 50 is arranged in an injection mold and one of the two damping elements 10 is produced by means of injection molding, i.e. the only one sleeve 50 is overmolded correspondingly. In this way, the only one sleeve 50 is arranged at the correct position in the damping element 10, so that the separate arranging of the only one sleeve 50 in the damping element 10 is omitted. This facilitates the manufacturing method further. If the sleeve 50 is supposed to be produced of a thermoplastic, it can also be produced by means of injection molding. In this respect, the only one sleeve 50 may be produced in the same tool, so that the damping element 10 with the only one sleeve 50 may be producible in there in a 2K injection molding.

The second damping element 10 is also produced by means of injection molding, wherein there is no sleeve in the injection mold. In this case, an assembly may take place such that, the damping element 10 with the only one sleeve 50 preassembled therein may be at least partly arranged in the component opening until the bottom side of the head portion 14 rests upon the component upper side. Then, the remaining damping element 10 is plugged into the component opening from the other side of the first component A, causing the second damping element 10 also engaging with the only one sleeve 50 and the bottom side of the head portion 14 of the second damping element 10 abutting the opposite component upper side of the first component A.

In a further embodiment of the manufacturing method, the sleeve 50 may consist of a metal or a thermoplastic. The sleeve 50 may consist of an electrically conductive material, which may be of an electrically conductive thermoplastic with or without fiber reinforcement. By choosing the respective material, the damping arrangement 1 is adapted to the desired application field.

In a further embodiment of the manufacturing method, the providing of one of the two identically constructed damping elements 10 may take place by overmolding the only one sleeve 50 with a material of the damping element 10 with a shore A hardness between 40 and 80 shore A. By means of this approach, the only one sleeve 50 is overmolded when injection-molding the damping element 10. In this context, the damping element 10 may be produced by means of vulcanization instead of injection molding. In this context, the only one sleeve 150 may include a plurality of breakthroughs 152. In this way, the only one sleeve 150 may be arranged in a safe manner in one of the damping elements 10, as is explained above.

Figure 33:
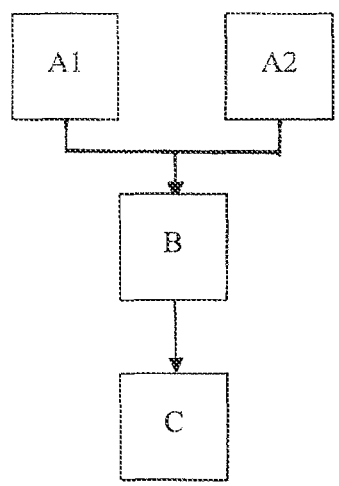

Finally, and with respect to FIG. 33, an embodiment of a connecting method of a first component A with a second component B is explained. Here, a first component A with damping arrangement 1 arranged in there is provided in a first step A1. In an alternative first step A2, a providing of a first component A and a damping arrangement 1 as well as an arranging of the damping arrangement 1 in an opening of the first component A takes place. In the subsequent second step B, a second component B with a second component opening is arranged in alignment with the first component opening. Finally, the connecting screw 3 is inserted in step C, so that the connecting screw 3 engages with a fastening portion 7 in or adjacent to the second component B.

The invention claimed is:

1. A damping arrangement which is fastenable in an opening of a first component and by which a dampened connection of the first component with a second component is realizable, the damping arrangement consisting of:
 a. two identically constructed damping elements, each damping element consisting of an elastomer or a thermoplastic elastomer formed with:
  a1. a head portion with a first outer diameter,
  a2. a shaft portion with a second outer diameter that is smaller than the first outer diameter and extends from a bottom side of the head portion, as well as
  a3. a central first thru-opening comprising a radially inwardly projecting projection adjacent to an upper side of the head portion, and
 b. only one sleeve with a central second thru-opening being arranged at least partly in the central first thru-opening of each damping element by means of a frictional and/or material connection, wherein the only one sleeve has an axial length which is larger than the axial length of one damping element but smaller than the axial length of two damping elements so that
 c. by means of the only one sleeve, the two damping elements with the first component arranged in between are fastenable to one another, wherein
  c1. the bottom side of the head portions of the two damping elements face each other and
  c2. the bottom sides of the head portions of the two damping elements abut at the first component, and
  c3. the sides of the shaft portions of the two damping elements which face away from the head of the respective damping element abut each other.

2. The damping arrangement according to claim 1, in which in the head portion, each damping element includes a projection at the radial outside extending parallel to the shaft portion.

3. The damping arrangement according to claim 2, in which between the shaft portion and the projection, a plurality of ribs is provided at the bottom side of the head portion.

4. The damping arrangement according to claim 1, in which a plurality of first and/or second breakthroughs is provided in the head portion of the damping element.

5. The damping arrangement according to claim 1, in which each damping element includes a plurality of radially inwardly projecting projections in the central first thru-opening, which realize the frictional connection to the only one sleeve.

6. The damping arrangement according to claim 1, wherein each damping element has a shore A hardness between 40 and 80 shore A.

7. The damping arrangement according to claim 1, in which the only one sleeve includes a plurality of breakthroughs.

8. A first component with a component opening and with the damping arrangement according to claim 1 being arranged at least partly in the component opening of the first component.

9. A component connection comprising the first component according to claim 8 as well as a second component with a second opening and a connecting element, wherein the connecting element extends through the damping arrangement and engages with a fitting fastening portion in or adjacent to the second component.

10. The component connection according to claim 9, wherein a radial tolerance compensation is realizable in that the only one sleeve has an inner diameter which is larger than the outer diameter of the connecting element.

11. The component connection according to claim 10, in which the connecting element includes a head and a shaft and a disc is provided between the head of the connecting element and the damping element of the damping arrangement which is arranged adjacent to the head of the connecting element, wherein an outer diameter of the disc is larger than an inner diameter of the opening in the first component.

12. The component connection according to claim 9, in which the connecting element includes a head and a shaft and a disc is provided between the head of the connecting element and the damping element of the damping arrangement which is arranged adjacent to the head of the connecting element, wherein an outer diameter of the disc is larger than an inner diameter of the opening in the first component.

13. A manufacturing method for a damping arrangement which is fastenable in an opening of a first component and by which a dampened connection of the first component with a second component is realizable, the damping arrangement consisting of:
   a. two identically constructed damping elements, each damping element consisting of an elastomer or a thermoplastic elastomer formed with:
      a1. a head portion with a first outer diameter,
      a2. a shaft portion with a second outer diameter that is smaller than the first outer diameter and extends from a bottom side of the head portion, as well as
      a3. a central first thru-opening comprising a radially inwardly projecting projection adjacent to an upper side of the head portion, and
   b. only one sleeve with a central second thru-opening being arranged at least partly in the central first thru-opening of each damping element b y means of a frictional and/or material connection, wherein the only one sleeve has an axial length which is larger than the axial length of one damping element but smaller than the axial length of two damping elements so that
   c. by means of the only one sleeve, the two damping elements with the first component arranged in between are fastenable to one another, wherein
      c1. the bottom side of the head portions of the two damping elements face each other and
      c2. the bottom sides of the head portions of the two damping elements abut at the first component, and
      c3. the sides of the shaft portions of the two damping elements which face away from the head of the respective damping element abut each other, the method including the steps:
   a. providing the two damping elements,
   b. providing the only one sleeve,
   c. arranging the only one sleeve in one of the two damping elements first and after that in the remaining damping element, so that the two damping elements with a first component arranged in between, are fastenable at each other by means of the only one sleeve.

14. The manufacturing method according to claim 13, in which the only one sleeve consists of a metal or a thermoplastic.

15. The manufacturing method according to claim 13, in which the only one sleeve is made of an electrically conductive material.

16. The manufacturing method according to claim 13, wherein the providing of one of the two damping elements takes place by overmolding the only one sleeve with a material of the damping element with a shore A hardness between 40 and 80 shore A.

* * * * *